United States Patent
Van Gundy et al.

(10) Patent No.: US 7,533,292 B2
(45) Date of Patent: May 12, 2009

(54) MANAGEMENT METHOD FOR SPARE DISK DRIVES IN A RAID SYSTEM

(75) Inventors: Steven R. Van Gundy, Gilroy, CA (US); Michael T. Benhase, Tucson, AZ (US); Brian C. Kraemer, Sacramento, CA (US); Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 10/891,743

(22) Filed: Jul. 15, 2004

(65) Prior Publication Data

US 2006/0015771 A1  Jan. 19, 2006

(51) Int. Cl.
G09F 11/00 (2006.01)
(52) U.S. Cl. ........................................ 714/7
(58) Field of Classification Search ...................... 714/7
See application file for complete search history.

(56) References Cited

U.S. PATENT DOCUMENTS

| | | | |
|---|---|---|---|
| 5,077,736 A | 12/1991 | Dunphy, Jr. et al. | |
| 5,155,835 A | 10/1992 | Belsan | |
| 5,351,246 A | 9/1994 | Blaum et al. | |
| 5,430,855 A | 7/1995 | Walsh et al. | |
| 6,282,670 B1 | 8/2001 | Rezaul Islam et al. | |
| 6,598,174 B1 | 7/2003 | Parks et al. | |
| 6,751,758 B1* | 6/2004 | Alipui et al. | 714/54 |
| 7,028,216 B2* | 4/2006 | Aizawa et al. | 714/7 |
| 7,313,721 B2* | 12/2007 | Ashmore | 714/7 |
| 2001/0044879 A1 | 11/2001 | Moulton et al. | |
| 2002/0162057 A1* | 10/2002 | Talagala | 714/54 |
| 2003/0188097 A1 | 10/2003 | Holland et al. | |
| 2007/0220313 A1* | 9/2007 | Katsuragi et al. | 714/6 |

* cited by examiner

*Primary Examiner*—Robert Beausoliel
*Assistant Examiner*—Elmira Mehrmanesh
(74) *Attorney, Agent, or Firm*—Kunzler & McKenzie (57) ABSTRACT

A RAID system employs a storage controller, a primary storage array having a plurality of primary storage units, and a spare storage pool having one or more spare storage units. A method of operating the storage controller in managing the primary storage array and the spare storage pool involves a testing by the storage controller of at least one repair service threshold representative of one or more operational conditions indicative of a necessity to repair at least one of the primary storage array and the spare storage unit, and a selective initiation by the storage controller of a repair service action for repairing one of the primary storage array and the spare storage unit based on the testing of the at least one repair service threshold.

15 Claims, 7 Drawing Sheets

MANAGEMENT METHOD FOR SPARE DISK DRIVES IN A RAID SYSTEM

FIELD OF INVENTION

The present invention generally relates to Redundant Array of Inexpensive Disks ("RAID") technology. The present invention specifically relates to providing reliable backup for data with a reduced cost RAID system.

BACKGROUND OF THE INVENTION

A RAID based disk drive storage system as known in the art can employ numerous hard disk drives ("HDD") in a RAID array, which can be the predominant failing component in the system in view of a failure rate of the numerous hard disk drives. As such, upon detecting a failed HDD in the RAID array, data stored in the failed HDD is migrated to a spare HDD whereby the spare HDD is rebuilt to match the failed HDD, and a repair service action is immediately initiated to facilitate a continued availability of the system. The cost associated with the serving each failed HDD in the RAID array, and a potential disruption to the users of the system has proven to be unacceptable in most cases. The computer industry is therefore continually striving to maximize the availability of the system to the users while minimizing the cost and disruption of repair services.

SUMMARY OF THE INVENTION

One form of the present invention is a method of operating a storage controller in managing a storage system including a primary storage array having a plurality of primary storage units and a spare storage pool having one or more spare storage units. The method involves a testing by the storage controller of at least one repair service threshold representative of one or more operational conditions indicative of a necessity to repair at least one of the primary storage array and the spare storage unit, and a selective initiation by the storage controller of a repair service action for repairing one of the primary storage array and the spare storage unit based on the testing of the at least one repair service threshold.

A second form of the present invention is a signal bearing medium tangibly embodying a program of machine-readable instructions executable by a processor to perform operations for operating a storage controller in managing a storage system including a primary storage array having a plurality of primary storage units and a spare storage pool having one or more spare storage units. The operations encompass a testing by the storage controller of at least one repair service threshold representative of one or more operational conditions indicative of a necessity to repair at least one of the primary storage array and the spare storage unit, and a selective initiation by the storage controller of a repair service action for repairing one of the primary storage array and the spare storage unit based on the testing of the at least one repair service threshold.

A third form of the present invention is controller employing a processor and memory storing instructions operable with the processor for operating the storage controller in managing a storage system including a primary storage array having a plurality of primary storage units and a spare storage pool having one or more spare storage units. The instructions encompass a testing by the storage controller of at least one repair service threshold representative of one or more operational conditions indicative of a necessity to repair at least one of the primary storage array and the spare storage unit, and a selective initiation by the storage controller of a repair service action for repairing one of the primary storage array and the spare storage unit based on the testing of the at least one repair service threshold.

A fourth form of the present invention is storage system employing a storage controller interfaced with a primary storage array having a plurality of primary storage units and a spare storage pool having one or more spare storage units. The storage controller tests at least one repair service threshold representative of one or more operational conditions indicative of a necessity to repair at least one of the primary storage array and the spare storage unit, and a selectively initiates a repair service action for repairing one of the primary storage array and the spare storage unit based on the testing of the at least one repair service threshold.

The forgoing forms as well as other forms, objects and aspects as well as features and advantages of the present invention will become further apparent from the following detailed description of various embodiments of the present invention, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
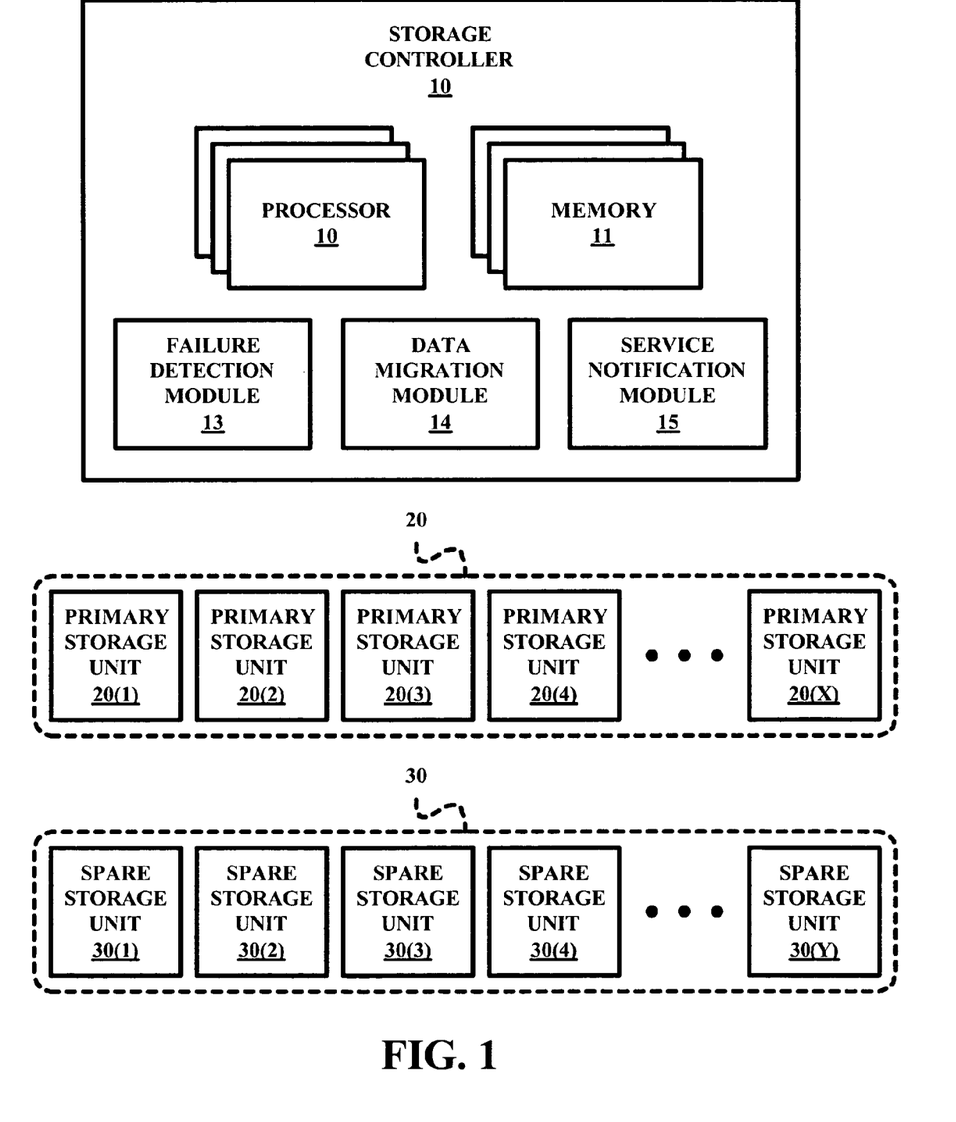
FIG. 1 illustrates a storage controller, a primary storage array and a spare storage pool in accordance with the present invention.

FIG. 1 illustrates a storage controller 10, a primary storage array 20, and a spare storage pool 30 of the present invention. Storage controller 10 employs one or more conventional processors 10, one or more conventional memories 11, a failure detection module 13, a data migration module 14 and a service notification module 15 to implement various storage management methods of the present invention as will be subsequently herein in connection with FIGS. 2 and 6. To this end, modules 13-15 are implemented in hardware, software stored in memories 11, firmware, or any mixture as would to occur to those having ordinary skill in the art.

Primary storage array 20 (e.g., a RAID array) employs an X number of primary storage units 20(1)-20(X), where X≧2. Primary storage units 20(1)-20(X) can be in the form of any type of conventional memory (e.g., any type of disk drive).

Spare storage pool 30 employs an Y number of spare storage units 30(1)-20(Y), where Y≧1. Spare storage units 30(1)-30(Y) also can be in the form of any type of conventional memory (e.g., any type of disk drive). Additionally, the form of primary storage units 20(1)-20(X) and the form of spare storage units 30(1)-30(X) can be identical or dissimilar. Furthermore, the operational characteristics of the primary storage units 20(1)-20(X) and the operational characteristics of the spare storage units 30(1)-30(X) can be identical or dissimilar. The operational characteristics of the units can include, but are not limited to, storage capacity, revolutions per minute, and an interface data rate.

In practice, various conventional network technologies as would occur to those having ordinary skill in the art can be implemented to interface storage controller 10, primary storage array 20, and spare storage pool 30 in any one of a variety of conventional network topologies. Upon a formation of a storage network employing a particular interfacing of storage controller 10, primary storage array 20, and spare storage pool 30, a primary storage unit failure management method as represented by a flowchart 40 illustrated in FIG. 2 and a repair service management method as represented by a flowchart 50 illustrated in FIG. 6 can be executed to derive various advantages and benefits of the present invention. To this end, controller 10 contains information defining the size and form of primary storage array 20, the pertinent operational characteristics each primary storage unit 20(1)-20(X), the size and form of spare storage pool 30, and the operational characteristics of each spare storage unit 30(1)-30(X).

Figure 2:
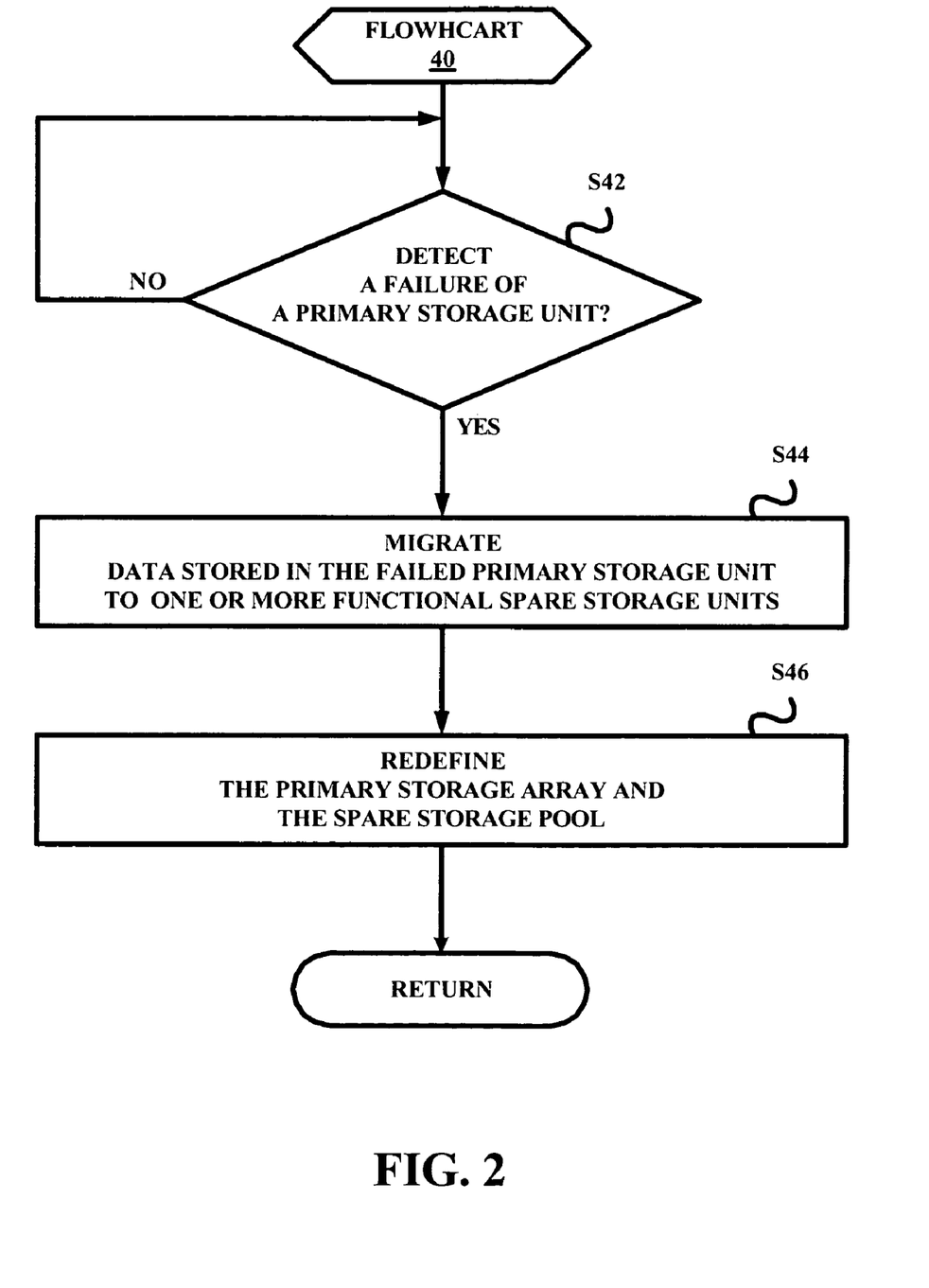
FIG. 2 illustrates a flow chart representative of one embodiment of a primary storage unit failure management method of the present invention.

Referring to FIG. 2, a stage S42 of flowchart 40 involves a conventional determination by controller 10 (FIG. 1) via module 13 (FIG. 1) as to whether a primary storage unit 20(1)-20(X) (FIG. 1) has failed (e.g., a read failure or a write failure). Controller 10 will loop this decision stage S42 until such time a failure by one of the primary storage units 20(1)-20(X) has been detected by controller 10, which thereafter sequentially proceeds to a stage S44 and a stage S46 of flowchart 40. Stage S44 involves a conventional migration by controller 10 via module 14 of data stored in the failed primary storage unit to one or more functional spare storage units in dependence upon a size of the data to be migrated relative to the storage capacities of the spare storage units. Stage S46 involves a redefining of primary storage array 20 and spare storage pool 30 by controller 10.

Figure 3:
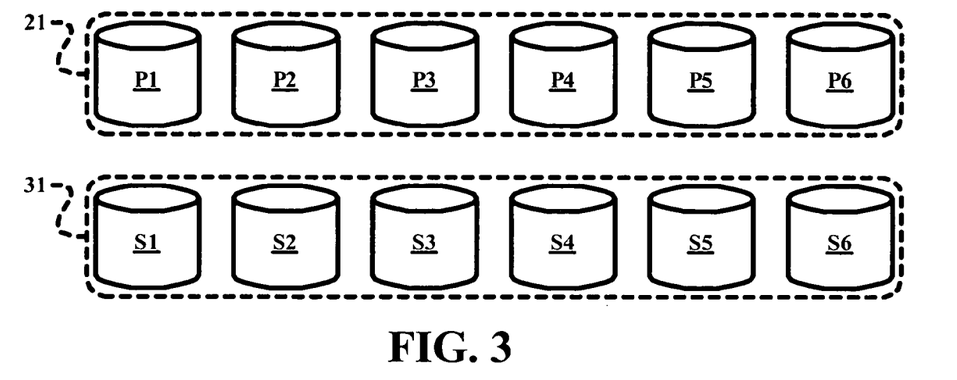
FIG. 3 illustrates exemplary embodiments of a primary storage array and a spare storage pool in accordance with the present invention prior to a failure of a primary storage unit in the primary storage array.
Figure 4:
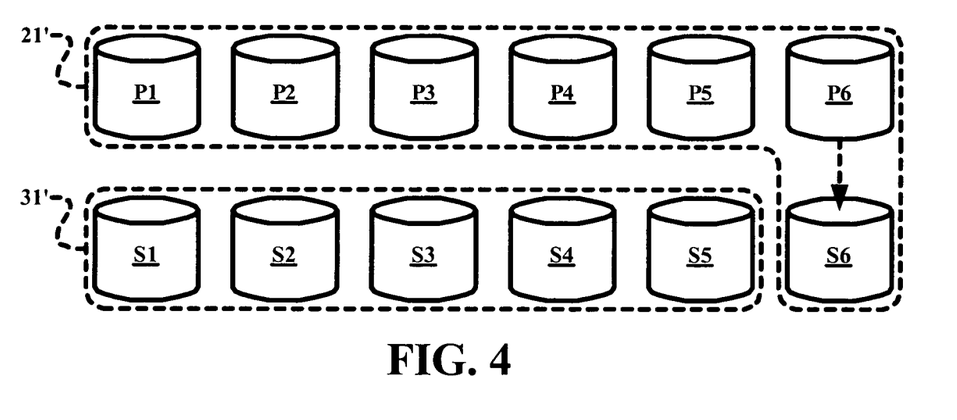
FIG. 4 illustrates exemplary embodiments of a primary storage array and a spare storage pool in accordance with the present invention subsequent to a failure of a primary storage unit in the primary storage array involving a migration of data from the failed primary storage unit to a single spare storage unit.
Figure 5:
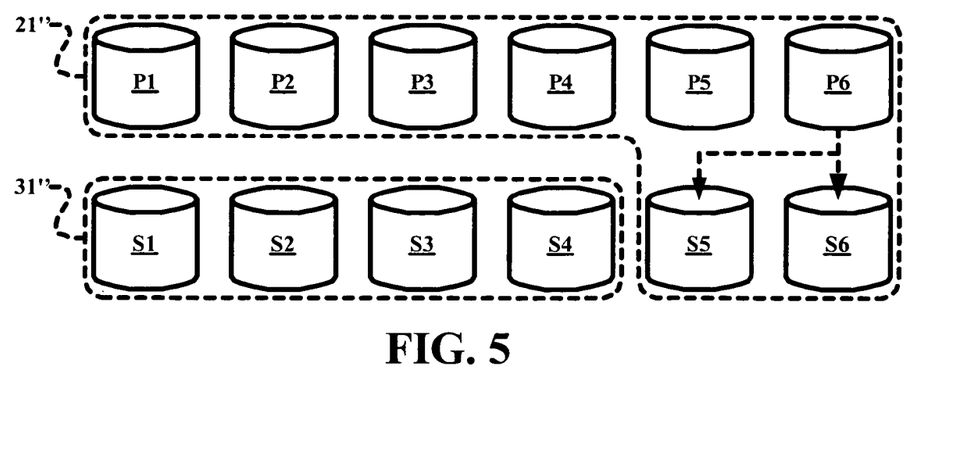
FIG. 5 illustrates exemplary embodiments of a primary storage array and a spare storage pool in accordance with the present invention subsequent to a failure of a primary storage unit in the primary storage array involving a migration of data from the failed primary storage unit to a pair of spare storage units.

To facilitate an understanding of stages S44 and S46, FIG. 3 illustrates a RAID primary storage array 21 as one form of primary storage array 20 (FIG. 1) having six (6) primary storage units P1-P6 and a spare storage pool 31 as one form of spare storage pool 30 (FIG. 1) having six (6) spare storage units S1-S6. In one example of stages S44 and S46, data from a failed primary storage unit P6 is conventionally migrated by controller 10 via module 14 to a spare storage unit S6 as illustrated in FIG. 4 whereby primary storage array 21 is redefined to a primary storage array 21' including primary storage units P1-P6 and spare storage unit S6, and spare storage pool 31 is redefined to a spare storage pool 31' including spare storage units S1-S5. In one example of stages S44 and S46, data from a failed primary storage unit P6 is conventionally migrated by controller 10 via module 14 to spare storage units S5 and S6 as illustrated in FIG. 5 whereby primary storage array 21 is redefined to a primary storage array 21" including primary storage units P1-P6 and spare storage units S5 and S6, and spare storage pool 31 is redefined to a spare storage pool 31" including spare storage units S1-S4. For both examples, primary storage unit P6 is deemed non-functional by controller 10 whereby any subsequent physical or logical addressing of primary storage unit P6 is directed to spare storage units containing the data migrated from primary storage unit P6.

Flowchart 40 returns to stage S42 upon a completion of stage S46. The return to stage S42 can be immediately, subsequent to an elapse of a particular time period, subsequent to an occurrence of one or more events, or any other facts deemed necessary to ensure an acceptable return to stage S42.

Figure 6:
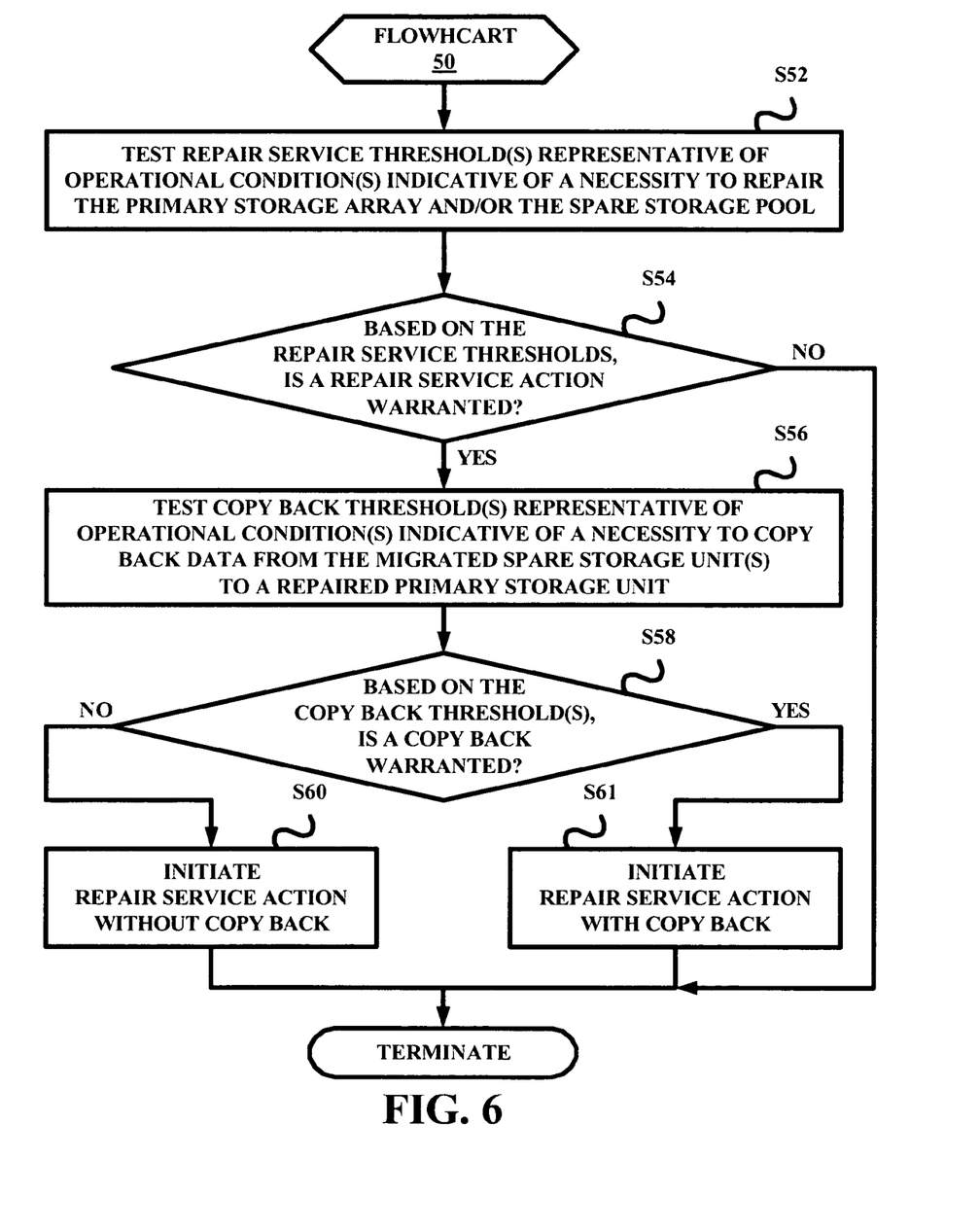
FIG. 6 illustrates a flow chart representative of one embodiment of repair service management method in accordance with the present invention.

Referring to FIG. 6, an execution of flowchart 50 is initiated on a periodic basis or sporadic basis until such time stage S44 has been invoked due to a detection of a failed primary storage unit. Irrespective of how the execution of flowchart 50 is initiated, a stage S52 of flowchart 50 involves a testing by controller 10 (FIG. 1) via module 15 (FIG. 1) of one or more repair service thresholds representative of operational conditions indicative of a necessity to repair (i.e., fix or replace) a primary storage array 20 (FIG. 1) and/or spare storage pool 30 (FIG. 1). In practice, a number and/or diversity of the repair service threshold(s) are dependent upon a commercial implementation of the present invention, and therefore are without limit. In one embodiment, the repair service thresholds are derived from (1) a comparison of one or more operational characteristics of the primary storage array and the spare storage pool, (2) an operational status of the primary storage array, and/or (3) an operational status of the spare storage pool.

To facilitate a further understanding of stage S52, the following TABLE 1 lists exemplary repair service thresholds in the context of an occurrence of a migration of data from failed primary storage unit P6 to a functional spare storage unit S6 as illustrated in FIG. 4:

TABLE 1

| NO. | REPAIR SERVICE THRESHOLDS | TRUE |
|---|---|---|
| 1 | A revolutions per minute of spare storage unit S6 is lower than a revolutions per minute of primary storage unit P6 | Y/N |
| 2 | An interface data rate of spare storage unit S6 is less than a storage capacity of primary storage unit P6 | Y/N |
| 3 | Spare storage unit S6 and one of primary storage units P1-P5 constitute a mirrored pair on the same device interface | Y/N |
| 4 | There are less than two (2) spare storage units among units S1-S4 with a storage capacity equal to or greater than a storage capacity of primary storage units P1-P5 | Y/N |
| 5 | There are less than two (2) spare storage units among units S1-S4 that are attached to the same interface | Y/N |
| 6 | A repair action is required for a non-failure condition of the primary storage array, and there is at least one inoperative spare storage units among units S1-S4 | Y/N |

Referring again to FIG. 2, a stage S54 of flowchart 50 involves a determination by controller 10 via module 15 as to whether a repair service is warranted based on the repair service thresholds tested during stage S52. In one embodiment, controller 10 implements a logical scheme during stage S52 to facilitate a determination by controller 10 as to whether a repair service is warranted based on the repair service thresholds tested during stage S52. For example, controller 10 can implement a logic OR operation of thresholds 1-6 listed in TABLE 1 whereby controller 10 determines a repair service is warranted if at least one of the repair service thresholds is deemed to be TRUE by controller 10 during stage S52. Also by example, controller 10 can implement a logic AND operation of thresholds 1-6 listed in TABLE 1 whereby controller 10 determines a repair service is warranted if and only if all of the repair service thresholds are deemed to be TRUE by controller 10 during stage S52.

Flowchart 50 is terminated by controller 10 upon controller 10 determining a repair service is not warranted during stage S54. Otherwise, a stage S56 of flowchart 50 involves a testing by controller 10 (FIG. 1) via module 15 (FIG. 1) of one or more copy back thresholds representative of operational conditions indicative of a necessity to copy back data from the migrated spare storage unit(s) to a repaired primary storage unit. In practice, a number and/or diversity of the copy back threshold(s) are dependent upon a commercial implementation of the present invention, and therefore are without limit. In one embodiment, the copy back thresholds are derived from (1) a comparison of one or more operational characteristics of the primary storage array and the spare storage pool, (2) an operational status of the primary storage array, and/or (3) an operational status of the spare storage pool.

To facilitate a further understanding of stage S52, the following TABLE 2 lists exemplary copy back thresholds 1-6 in the context of an occurrence of a migration of data from failed primary storage unit P6 to a functional spare storage unit S6 as illustrated in FIG. 4:

TABLE 2

| NO. | COPY BACK THRESHOLDS | TRUE |
|---|---|---|
| 1 | A storage capacity of spare storage unit S6 is lower than a storage capacity of primary storage unit P6 | Y/N |
| 2 | A revolutions per minute of spare storage unit S6 is lower than a revolutions per minute of primary storage unit P6 | Y/N |
| 3 | A revolutions per minute of spare storage unit S6 is greater than a revolutions per minute of primary storage unit P6 | Y/N |
| 4 | An interface data rate of spare storage unit S6 is less than a storage capacity of primary storage unit P6 | Y/N |
| 5 | An interface data rate of spare storage unit S6 is greater than a storage capacity of primary storage unit P6 | Y/N |
| 6 | Spare storage unit S6 and one of primary storage units P1-P5 constitute a mirrored pair on the same device interface | Y/N |
| 7 | An interface configuration of the primary storage array and/or spare storage pool is incorrect | Y/N |

A stage S58 of flowchart 50 involves a determination by controller 10 via module 15 as to whether a copy back is warranted based on the copy back thresholds tested during stage S56. In one embodiment, controller 10 implements a logical scheme during stage S56 to facilitate a determination by controller 10 as to whether a copy back is warranted based on the copy back thresholds tested during stage S56. For example, controller 10 can implement a logic OR operation of thresholds 1-7 listed in TABLE 2 whereby controller 10 determines a copy back is warranted if at least one of the copy back thresholds is deemed to be TRUE by controller 10 during stage S56. Also by example, controller 10 can implement a logic AND operation of thresholds 1-7 listed in TABLE 3 whereby controller 10 determines a copy back is warranted if and only if all of the copy back thresholds 1-7 are deemed to be TRUE by controller 10 during stage S56.

Upon a determination that a copy back is not warranted during state S58, controller 10 proceeds to a stage S60 of flowchart 50 to initiate a repair service action without a copy back. Conversely, upon a determination that a copy back is warranted during state S58, controller 10 proceeds to a stage S62 of flowchart 50 to initiate a repair service action with a copy back.

In practice, the initiation of the repair service is dependent upon a commercial implementation of the present invention, and is therefore without limit. In one embodiment, controller 10 establishes a communication with a service center to thereby request a repair service visit whereby a repair person can repair (i.e., fix or replace) any failed storage disks, incorrect interface configurations, or any other problems associated with the primary storage array and/or the spare storage pool. As to the copy back, the request for repair service visit can indicate a need of a copy back and/or techniques on site can be implemented to indicate a copy back is needed (e.g., a beep, a lit LED, etc.)

Figure 7:
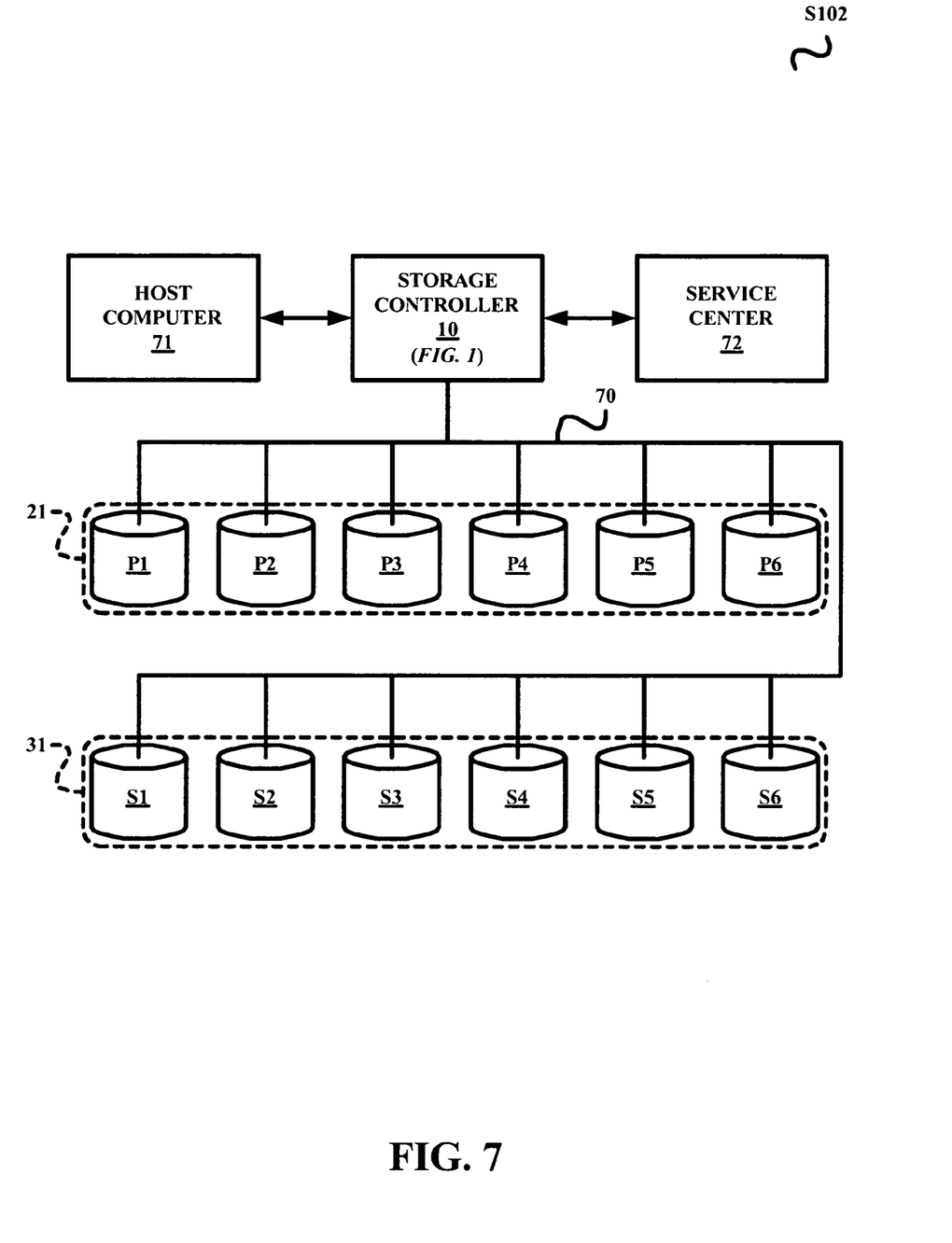
FIG. 7 illustrates a first embodiment of a RAID storage system in accordance with the present invention.

As previously described in connection with FIG. 1, various conventional network technologies as would occur to those having ordinary skill in the art can be implemented to interface storage controller 10, primary storage array 20, and spare storage pool 30 in any one of a variety of conventional network topologies. FIG. 7 is an exemplary illustration of a bus topology wherein storage controller 10 is interfaced via a bus 70 to a primary storage array 21 (FIG. 3) and spare storage pool 31 (FIG. 3). Storage controller 10 is further interfaced, directly or indirectly via a network, to a host computer 71 for issuing read and write requests to controller 10 and a service center 72 for responding to a repair service action initiated by controller 10.

Figure 8:
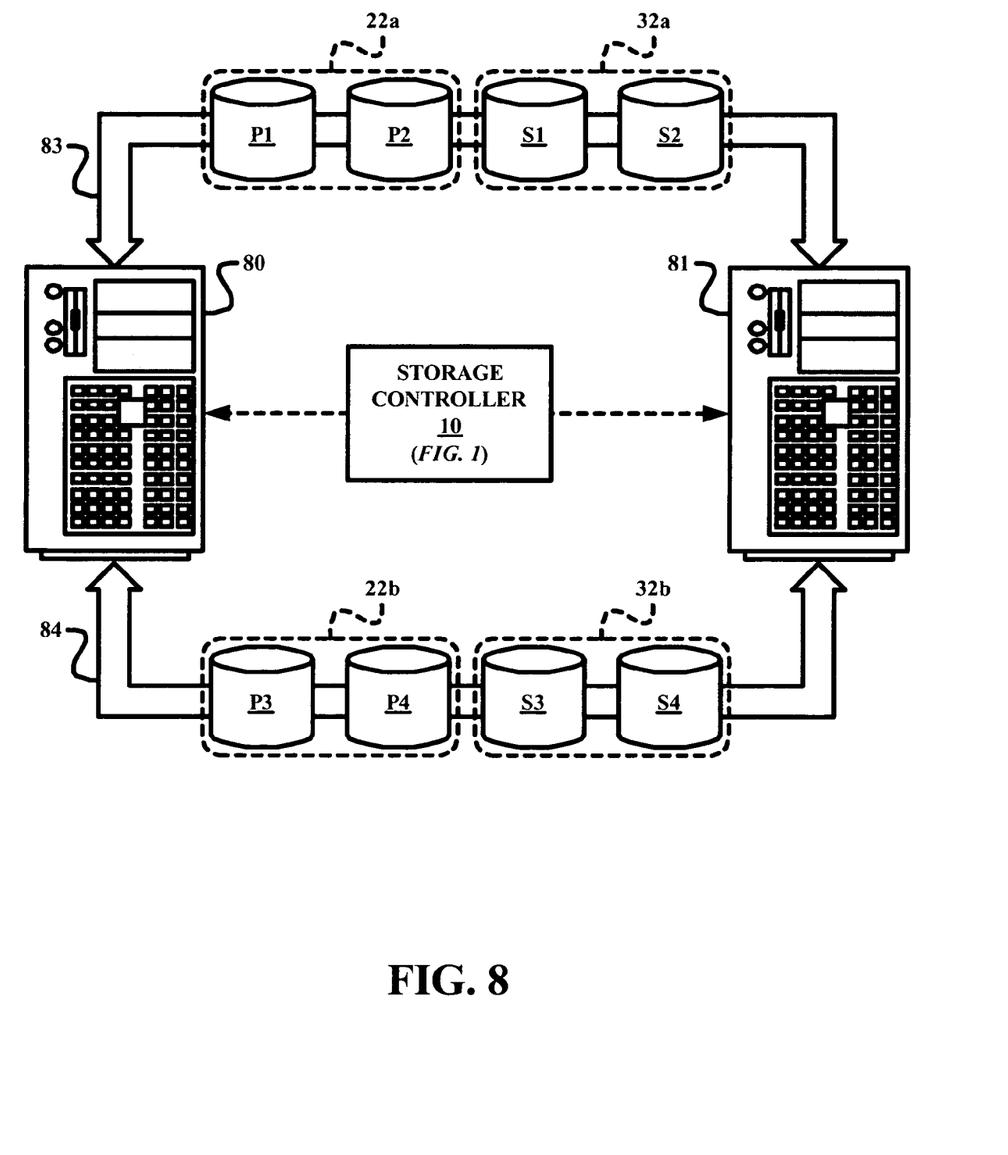
FIG. 8 illustrates a second embodiment of a RAID storage system in accordance with the present invention.

FIG. 8 is an exemplary illustration of a fibre channel arbitrated loop ("FCAL") system wherein storage controller 10 is integrated into a pair of servers 80 and 81, which are interfaced via 10 adapter cards (not shown) and a fiber channel arbitrated loop connections 83 and 84 to a primary storage array 22 and spare storage pool 32.

Figure 9:
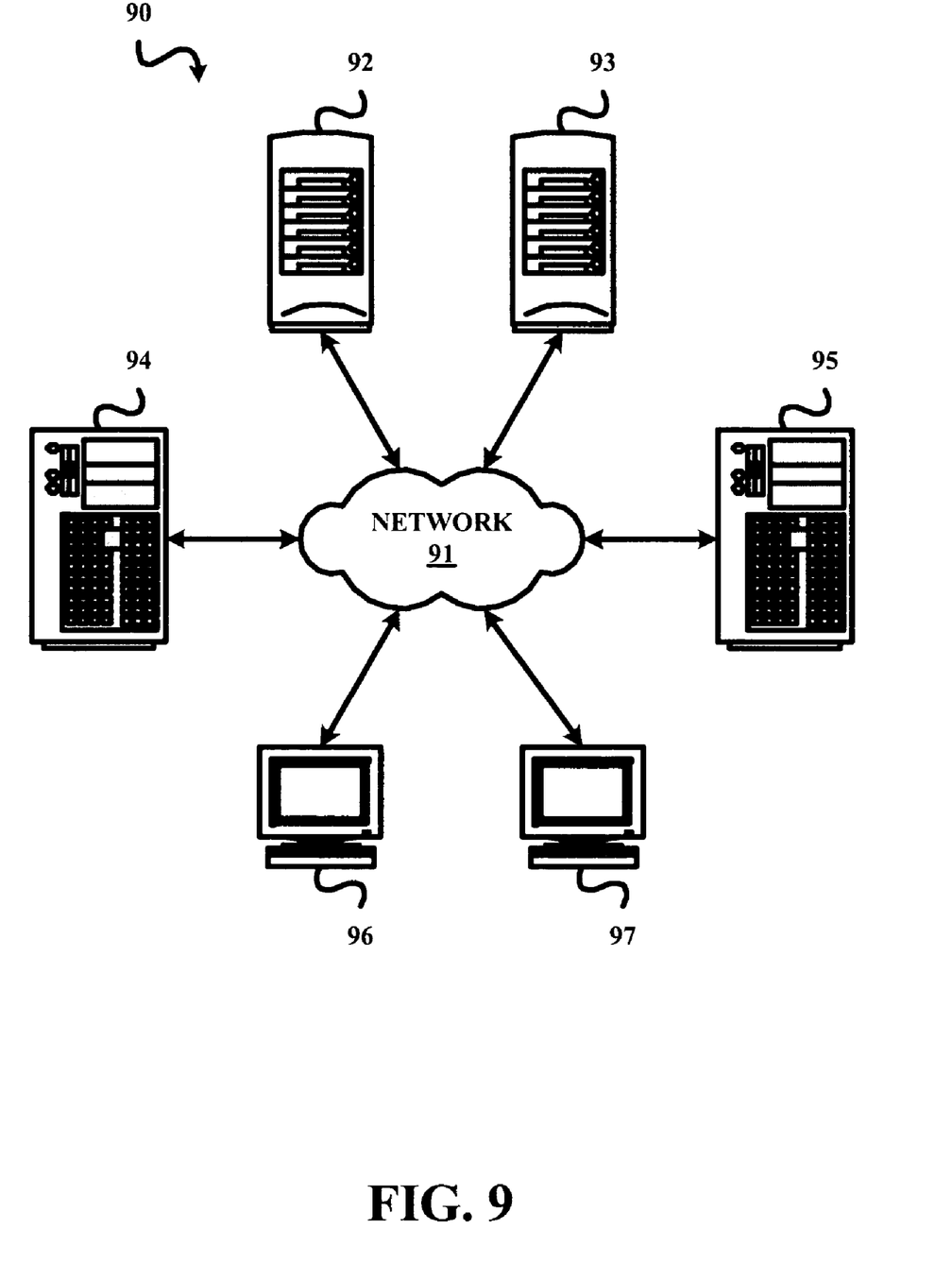
FIG. 9 illustrates one embodiment of a network of distributed data processing systems in accordance with the present invention.

The present invention could be implemented on a variety of hardware platforms. FIG. 9 depicts a distributed data processing network 90 employing a network 91, which is the media used to provide communications links between various devices and computers connected together within distributed data processing network 90. Network 91 may include permanent connections, such as wire or fiber optic cables, or temporary connections made through telephone or wireless communications.

In the depicted example, a pair of RAID systems 92 and 93, a pair of conventional a service centers 94 and 95, and a pair of conventional clients 96 and 97 are connected to network 91. Storage system 92 and Storage system 93 represent a Storage system in accordance with the present invention, such as, for example, a RAID system including storage controller 10, a primary storage array 20 and a spare storage pool 30 as illustrated in FIG. 1. Service centers 94 and 95, and clients 96 and 97 represent a variety of conventional computing devices, such as mainframes, personal computers, personal digital assistants (PDAs), etc. Distributed data processing network 90 may include more or less Storage systems, servers and clients as shown as well as additional networks, routers, and other devices as would occur to those having ordinary skill in the art.

Distributed data processing network 90 may include the Internet with network 91 representing a worldwide collection of networks and gateways that use the TCP/IP suite of protocols to communicate with one another. Of course, distributed data processing network 130 may also include a number of different types of networks, such as, for example, an intranet, a local area network (LAN), or a wide area network (WAN).

FIG. 9 is intended as an example of a heterogeneous computing environment and not as an architectural limitation for the present invention. While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method of operating a storage controller for managing a Storage system including a primary storage array having a plurality of primary storage units and a spare storage pool having at least one spare storage unit, the method comprising:
   operating the storage controller to detect any failure in a primary storage unit within the primary storage array;
   operating the storage controller to migrate data from the primary storage array to the spare storage pool in response to a detection of a failure in the primary storage unit within the primary storage array;
   operating the storage controller to test at least one repair service threshold in response to the detection of the failure in a storage unit within the primary storage array, the repair service threshold representative of at least one operational condition indicative of a necessity to repair at least one of the primary storage array and the spare storage unit; and
   operating the storage controller to selectively initiate a repair service action for repairing one of the primary storage array and the spare storage unit based on the testing of the at least one repair service threshold.

2. The method of claim 1, wherein the at least one repair service threshold is derived from at least one of a comparison of one or more operational characteristics of the primary storage array and the spare storage pool, an operational status of the primary storage array, and an operational status of the spare storage pool.

3. The method of claim 1, further comprising:
   operating the storage controller to test at least one copy back threshold representative of at least one operational condition indicative of a necessity to copy back data migrated from the primary storage away to the spare storage unit in response to the storage controller selecting to initiate a repair service action based on the testing of the at least one repair service threshold; and
   operating the storage controller to selectively establishing a requirement to copy back the data based on the testing of the at least one copy back threshold.

4. The method of claim 3, wherein the at least one copy back threshold is derived from at least one of a comparison of one or more operational characteristics of the primary storage array and the spare storage pool, an operational status of the primary storage array, and an operational status of the spare storage pool.

5. The method of claim 1 wherein the repair service threshold is selected from the group consisting of revolutions per minute of spare storage unit compared to the revolutions per minute of the primary storage unit, the interface data rate of the spare storage unit compared to the primary storage unit, whether the spare storage unit and primary storage unit are a mirrored pair on the same device interface, the number of spare storage units with a storage capacity equal to or greater than a storage capacity of the primary storage units, the number of spare storage units attached to the same interface, and a repair action required for a non-failure condition of at least one primary storage unit and at least one inoperative spare storage unit.

6. A computer readable storage medium tangibly embodying a program of machine-readable instructions executable by a processor to perform operations to operate a storage controller in managing a Storage system including a primary storage array having a plurality of primary storage units and a spare storage pool having at least one spare storage unit, the operations comprising:
   operating the storage controller to detect any failure in a primary storage unit within the primary storage array;
   operating the storage controller to migrate data from the primary storage away to the spare storage pool in response to a detection of a failure in the primary storage unit within the primary storage array;
   operating the storage controller to test at least one repair service threshold in response to the detection of the failure in a storage unit within the primary storage array, the repair service threshold representative of at least one operational condition indicative of a necessity to repair at least one of the primary storage array and the spare storage unit; and
   operating the storage controller to selectively initiate a repair service action for repairing one of the primary storage away and the spare storage unit based on the testing of the at least one repair service threshold.

7. The computer readable storage medium of claim 6, wherein the at least one repair service threshold is derived from at least one of a comparison of one or more operational characteristics of the primary storage away and the spare storage pool, an operational status of the primary storage array, and an operational status of the spare storage pool.

8. The computer readable storage medium of claim 6, wherein the operations further comprise:
   operating the storage controller to test at least one copy back threshold representative of at least one operational condition indicative of a necessity to copy back data migrated from the primary storage away to the spare storage unit in response to the storage controller selecting to initiate a repair service action based on the testing of the at least one repair service threshold; and
   operating the storage controller to selectively establishing a requirement to copy back the data based on the testing of the at least one copy back threshold.

9. The computer readable storage medium of claim 8, wherein the at least one copy back threshold is derived from at least one of a comparison of one or more operational characteristics of the primary storage away and the spare storage pool, an operational status of the primary storage array, and an operational status of the spare storage pool.

10. A storage controller, comprising:
    a processor; and
    memory storing instructions operable with the processor for operating the storage controller in managing a Storage system including a primary storage away having a plurality of primary storage units and a spare storage pool having at least one spare storage unit, the instructions being executed for:
    operating the storage controller to detect any failure in a primary storage unit within the primary storage array;
    operating the storage controller to migrate data from the primary storage array to the spare storage pool in response to a detection of a failure in the primary storage unit within the primary storage array;
    operating the storage controller to test at least one repair service threshold in response to the detection of the failure in a storage unit within the primary storage array, the repair service threshold representative of at least one operational condition indicative of a necessity to repair at least one of the primary storage array and the spare storage unit;

operating the storage controller to selectively initiate a repair service action for repairing one of the primary storage array and the spare storage unit based on the testing of the at least one repair service threshold operating the storage controller to test at least one copy back threshold representative of at least one operational condition indicative of a necessity to copy back data migrated from the primary storage array to the spare storage unit in response to the storage controller selecting to initiate a repair service action based on the testing of the at least one repair service threshold; and operating the storage controller to selectively establishing a requirement to copy back the data based on the testing of the at least one copy back threshold.

11. The storage controller of claim 10, wherein the at least one repair service threshold is derived from at least one of a comparison of one or more operational characteristics of the primary storage array and the spare storage pool, an operational status of the primary storage array, and an operational status of the spare storage pool.

12. The storage controller of claim 11, wherein the at least one copy back threshold is derived from at least one of a comparison of one or more operational characteristics of the primary storage array and the spare storage pool, an operational status of the primary storage array, and an operational status of the spare storage pool.

13. A storage system, comprising:
a primary storage away including a plurality of primary storage units;
a spare storage pool including at least one spare storage unit; and
a storage controller interfaced with the primary storage array and the spare storage pool,
wherein the storage controller is operable to:
detect any failure within the primary storage array;
migrate data from the primary storage array to the spare storage pool in response to a detection of a failure within the primary storage array;
test at least one repair service threshold in response to the detection of the failure in a storage unit within the primary storage array, the repair service threshold representative of at least one operational condition indicative of a necessity to repair at least one of the primary storage array and the spare storage unit;
selectively initiate a repair service action for repairing one of the primary storage array and the spare storage unit based on the testing of the at least one repair service threshold
test at least one copy back threshold representative of at least one operational condition indicative of a necessity to copy back data migrated from the primary storage array to the spare storage unit in response to the storage controller selecting to initiate a repair service action based on the testing of the at least one repair service threshold; and
selectively establishing a requirement to copy back the data based on the testing of the at least one copy back threshold.

14. The storage system of claim 13, wherein the at least one repair service threshold is derived from at least one of a comparison of one or more operational characteristic of the primary storage array and the spare storage pool, an operational status of the primary storage array, and an operational status of the spare storage pool.

15. The storage system of claim 13, wherein the at least one copy back threshold is derived from at least one of a comparison of one or more operational characteristic of the primary storage away and the spare storage pool, an operational status of the primary storage array, and an operational status of the spare storage pool.

* * * * *